US012304657B2

(12) United States Patent
Hurst et al.

(10) Patent No.: US 12,304,657 B2
(45) Date of Patent: May 20, 2025

(54) UNMANNED AERIAL SYSTEM KIOSK

(71) Applicant: Bell Textron Inc., Fort Worth, TX (US)

(72) Inventors: Jason Paul Hurst, Fort Worth, TX (US); John Robert Wittmaak, Jr., Newark, TX (US); Joshua Allan Edler, Irving, TX (US); Chad Sparks, Mansfield, TX (US); Nicholas Brodeur, Beaconsfield (CA)

(73) Assignee: Textron Innovations Inc., Providence, RI (US)

( * ) Notice: Subject to any disclaimer, the term of this patent is extended or adjusted under 35 U.S.C. 154(b) by 432 days.

(21) Appl. No.: 17/538,536

(22) Filed: Nov. 30, 2021

(65) Prior Publication Data

US 2022/0388682 A1    Dec. 8, 2022

Related U.S. Application Data

(60) Provisional application No. 63/195,951, filed on Jun. 2, 2021.

(51) Int. Cl.
| | |
|---|---|
| *B64F 1/00* | (2024.01) |
| *B64F 1/222* | (2024.01) |
| *B64F 1/32* | (2006.01) |
| *B64F 1/36* | (2017.01) |
| *B64U 70/95* | (2023.01) |
| *E04B 1/343* | (2006.01) |

(Continued)

(52) U.S. Cl.
CPC .............. *B64F 1/362* (2013.01); *B64F 1/005* (2013.01); *B64F 1/222* (2013.01); *B64F 1/32* (2013.01); *B64U 70/95* (2023.01); *E04B 1/343* (2013.01); *E04B 7/16* (2013.01); *E04H 6/44* (2013.01); *G06Q 10/0836* (2013.01); *G06Q 10/0838* (2013.01); *B64U 10/20* (2023.01); *B64U 80/25* (2023.01); *B64U 80/86* (2023.01); *B64U 2101/60* (2023.01); *G01W 1/02* (2013.01)

(58) Field of Classification Search
CPC .. B64F 1/362; B64F 1/005; B64F 1/00; B64F 1/222; B64F 1/32; B64C 39/024; B64C 39/028; E04B 1/343; E04B 7/16; E04H 6/44; G06Q 10/0836; G06Q 10/0838; B64U 80/86; B64U 2101/60; G01W 1/02
See application file for complete search history.

(56) References Cited

U.S. PATENT DOCUMENTS

| | | | |
|---|---|---|---|
| 9,880,563 B2 * | 1/2018 | Fisher | B64D 47/08 |
| 10,850,866 B2 * | 12/2020 | Fisher | B64C 39/024 |

(Continued)

*Primary Examiner* — Chi Q Nguyen
(74) *Attorney, Agent, or Firm* — Akona IP PC (57) ABSTRACT

A kiosk for use an unmanned aerial system (UAS) delivery system is disclosed. In one embodiment, the kiosk includes an enclosure comprising at least one vertical wall having a secured entrance therethrough to prevent unauthorized persons from entering the enclosure, wherein an external appearance of the enclosure corresponds to a location of the kiosk; a landing zone for an unmanned aerial vehicle (UAV) of the UAS located within the enclosure, the landing zone comprising infrastructure from which the UAV can take off and on which the UAV can land; sensors for detecting an environment of at least one of the kiosk and the enclosure; and a guidance system for providing signals to the UAV to guide the UAV into the enclosure and onto the landing zone.

18 Claims, 5 Drawing Sheets

(51) Int. Cl.
  *E04B 7/16* (2006.01)
  *E04H 6/44* (2006.01)
  *G06Q 10/083* (2023.01)
  *G06Q 10/0836* (2023.01)
  *B64U 10/20* (2023.01)
  *B64U 80/25* (2023.01)
  *B64U 80/86* (2023.01)
  *B64U 101/60* (2023.01)
  *G01W 1/02* (2006.01)

(56) References Cited

U.S. PATENT DOCUMENTS

| | | | |
|---|---|---|---|
| 10,967,960 B2* | 4/2021 | Venturelli | B60L 53/68 |
| 2015/0120602 A1* | 4/2015 | Huffman | G06Q 10/083 |
| | | | 700/214 |
| 2016/0229299 A1* | 8/2016 | Streett | B64C 39/024 |
| 2016/0376031 A1* | 12/2016 | Michalski | G05D 1/652 |
| | | | 701/15 |
| 2017/0101017 A1* | 4/2017 | Streett | G05D 1/0088 |
| 2017/0177006 A1* | 6/2017 | Fisher | B64D 47/08 |
| 2017/0203857 A1* | 7/2017 | O'Toole | B64C 39/024 |
| 2017/0215620 A1* | 8/2017 | Dade | F25D 17/00 |
| 2017/0225802 A1* | 8/2017 | Lussier | E04H 12/003 |
| 2018/0305125 A1* | 10/2018 | Guo | B25J 13/08 |
| 2020/0272141 A1* | 8/2020 | Chung | G05D 1/005 |
| 2020/0288895 A1* | 9/2020 | Bennet | H04W 12/08 |
| 2021/0107684 A1* | 4/2021 | Le Lann | B65D 88/121 |
| 2022/0169366 A1* | 6/2022 | Truong | B64U 50/19 |

* cited by examiner

UNMANNED AERIAL SYSTEM KIOSK

CROSS-REFERENCE TO RELATED APPLICATION

This application claims the benefit of and priority to U.S. patent application Ser. No. 63/195,951, filed Jun. 2, 2021, entitled "UNMANNED AERIAL SYSTEM KIOSK," which is incorporated herein by reference in its entirety.

TECHNICAL FIELD

This disclosure relates in general to the field of aircraft and, more particularly, though not exclusively, to an unmanned aerial system (UAS) kiosk.

BACKGROUND

Unlike fixed wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed wing aircraft may be unable to take off and land. Helicopters, however, typically lack the forward airspeed of fixed wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed wing aircraft.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based, or remote, controller, and a system of communication between the vehicle and controller.

SUMMARY

One embodiment is a kiosk for use an unmanned aerial system (UAS) delivery system is disclosed. In one embodiment, the kiosk includes an enclosure comprising at least one vertical wall having a secured entrance therethrough to prevent unauthorized persons from entering the enclosure, wherein an external appearance of the enclosure corresponds to a location of the kiosk; a landing zone for an unmanned aerial vehicle (UAV) of the UAS located within the enclosure, the landing zone comprising infrastructure from which the UAV can take off and on which the UAV can land; sensors for detecting an environment of at least one of the kiosk and the enclosure; and a guidance system for providing signals to the UAV to guide the UAV into the enclosure and onto the landing zone.

Another embodiment is a kiosk for use an unmanned aerial system (UAS) delivery system, the kiosk comprising an enclosure comprising at least one wall including a door therethrough; a package receipt system within the enclosure, the package receipt system comprising a package sorting funnel for receiving a package from a UAV hovering over the packages sorting funnel, wherein the package includes radio frequency identification (RFID) tag affixed thereto; a locker system comprising a plurality of secured lockers; a package sorting system that places the received package into one of the plurality of secured lockers based on the RFID tag; and a notification system for providing a notification to a recipient of the received package, wherein the recipient is identified based on the RFID tag.

Yet another embodiment is a package receipt system for an unmanned aerial system (UAS) delivery system, the package receipt system comprising a package sorting funnel for receiving a package from a UAV hovering over the packages sorting funnel, wherein the package includes RFID tag affixed thereto; a locker system comprising a plurality of secured lockers; a package sorting system that places the received package into one of the plurality of lockers based on the RFID tag; and a notification system for providing a notification to a recipient of the received package, wherein the recipient is identified based on the RFID tag.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For convenience, if a collection of drawings designated by the same number and different letters is presented (e.g., FIGS. 1A-1D), the collection may be referred to herein without the letters (e.g., FIG. 1). Similarly, if a collection of elements designated by the same reference numeral and different letters are presented in the drawings (e.g., elements 10a-10n), the collection may be referred to herein without the letters (e.g., element 10).

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1:
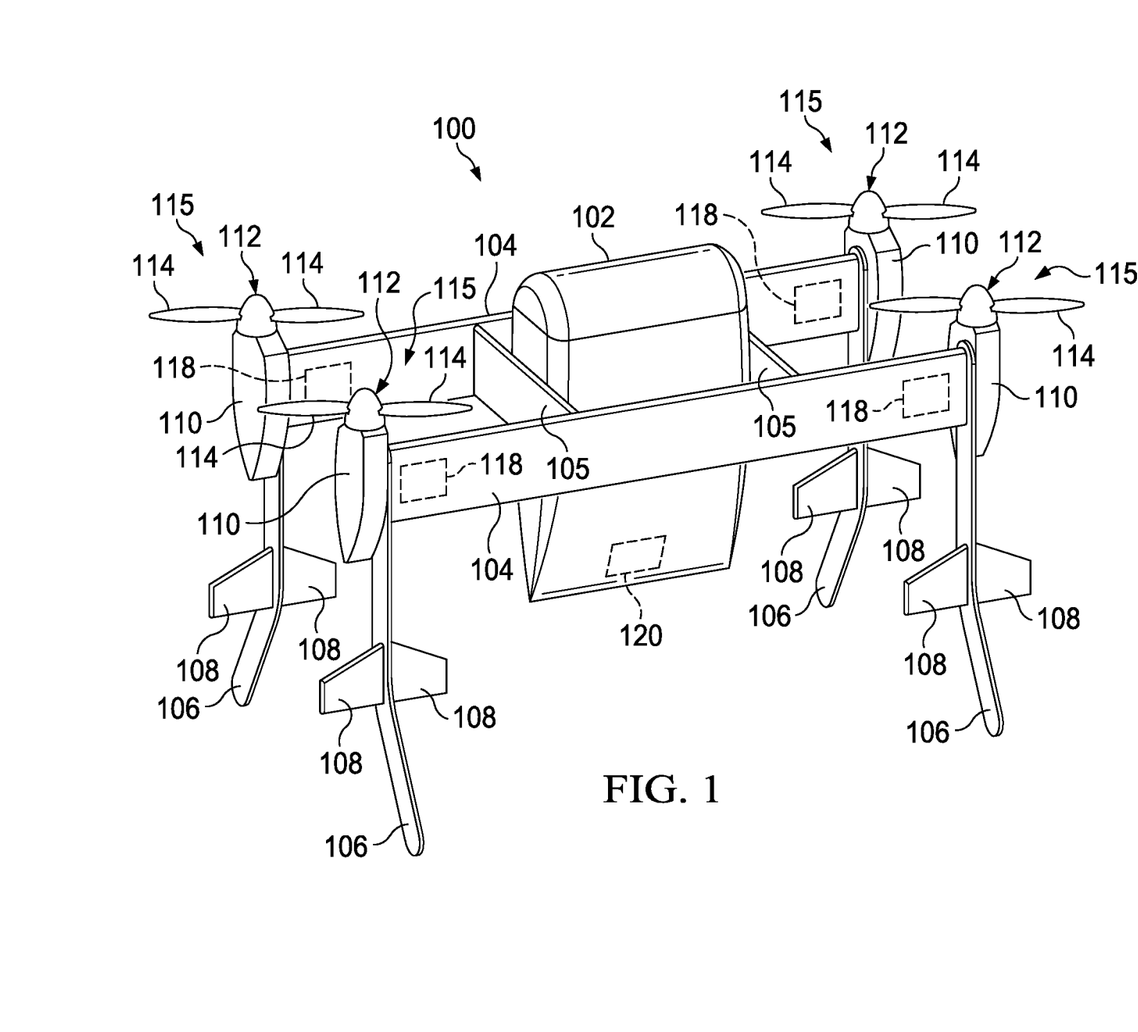
FIGS. 1 and 2 illustrate an example UAV for use in connection with a UAS kiosk in accordance with certain example embodiments.
Figure 2:
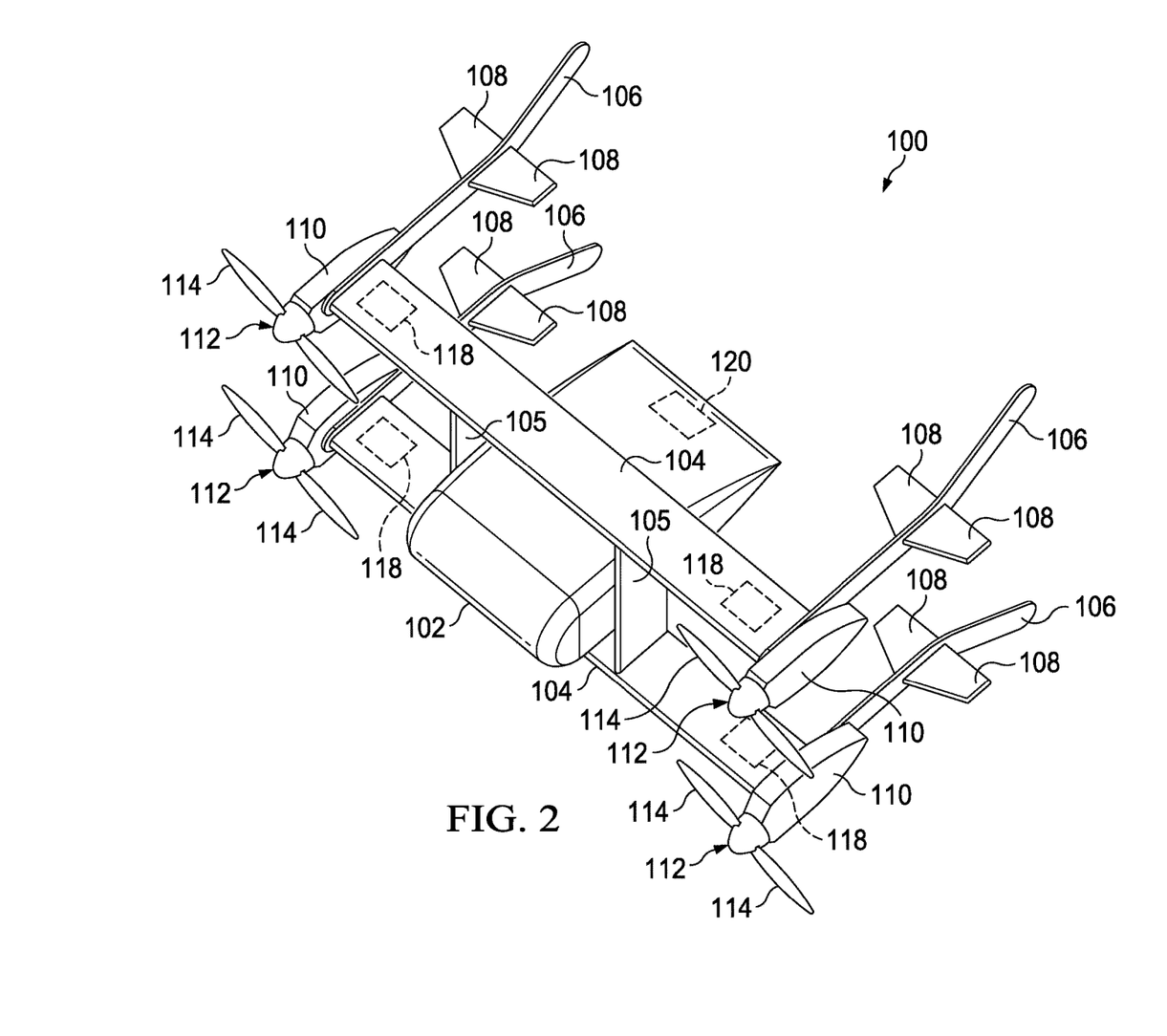

Referring now to FIGS. 1 and 2, illustrated therein is an example embodiment of an aircraft 100, which in the illustrated examples is generally configured as a vertical takeoff and landing ("VTOL") aircraft. More specifically, aircraft 100 may be an autonomous pod transport ("APT") convertible drone-type aircraft (discussed in further detail below) that is operable in different flight modes including a helicopter mode (as shown in FIG. 11) and an airplane mode (as shown in FIG. 2). In helicopter mode, aircraft 100 may be capable of various flight maneuvers including, but not limited to, vertical takeoff from and landing to one or more landing zone(s), hover, and/or sideward and rearward mobility or flight. In airplane mode, aircraft 100 may be capable of forward flight maneuvers. Additionally, since aircraft 100 is a convertible aircraft, it is also operable in a conversion, or transition, mode when transitioning between the helicopter and airplane modes.

As previously noted, unlike fixed wing aircraft, VTOL aircraft do not require runways. Instead, VTOL aircraft are capable of taking off, hovering, and landing vertically. As also noted above, helicopters and tiltrotors are examples of VTOL aircraft. Yet another type of VTOL aircraft is commonly referred to as a "tailsitter" aircraft. As the name implies, a tailsitter aircraft takes off and lands on its tail, but tilts horizontally for forward flight. As illustrated in the embodiments of FIGS. 1 and 2, aircraft 100 is configured as a tailsitter aircraft. Being a drone-type aircraft, aircraft 100 is configured for remote control and operation. Additionally, at least in some embodiments, aircraft 100 may be fully autonomous and self-directed via a predetermined or pre-programmed location-based guidance system (e.g., global positioning system ("GPS"), coordinate-based location, street address, etc.). Additionally, aircraft 100 may be a manned aircraft.

In at least one embodiment, aircraft 100 may include a cargo pod 102 that functions as the fuselage, wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. Each combination of a pylon 110 and its associated rotor system 112 comprising rotor blades 114 may be referred to herein as a propulsion assembly 115. Aircraft 100 may also include plurality of aircraft sensors 118 and a control system 120. Wings 104 comprise a substantially parallel, double-wing (sometimes referred to as "biplane") configuration that provides lift to the aircraft 100 during forward flight (e.g., as shown in FIG. 2) while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 may provide a wider base for landing gear uses. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor (not shown) within each pylon 110. However, in other embodiments, the rotor systems 112 may be driven by a combustion engines or auxiliary power unit through a plurality of interconnect driveshafts and/or auxiliary gearboxes, which may be housed within any portion of an aircraft (e.g., within a pylon, fuselage, combinations thereof, or the like). Furthermore, since aircraft 100 functions as a convertible aircraft, the rotational speeds of each rotor system 112 may be selectively controlled to orient aircraft 100 in the various flight modes.

In various embodiments, control system 120 may include one or more processor(s), memory element(s), network connectivity device(s), storage, input/output (I/O) device(s), combinations thereof, or the like to facilitate operations of each propulsion assembly 115 and/or other electronic systems of aircraft 100. In various embodiments, operation of each propulsion assembly 115 may include controlling the rotational speed of rotor systems 112, adjusting thrust vectors of rotor systems 112, and the like to facilitate vertical lift operations, forward thrust operations, transition operations, combinations thereof, or the like for aircraft 100. In some embodiments, feedback may be received by control system 120 (e.g., via each propulsion assembly 115, one or more sensors 118, etc.) to facilitate or augment various operations of aircraft 100. In various embodiments, sensors 118 may include, but not be limited to, positioning sensors, attitude sensors, speed sensors, environmental sensors, fuel sensors, temperature sensors, location sensors, combinations thereof, or the like.

When aircraft 100 is in a helicopter mode position, rotor systems 112 may provide a vertical lifting thrust for aircraft 100, which may enable hover flight operations to be performed by aircraft 100. When aircraft 100 is in an airplane mode position, rotor systems 112 may provide ±a forward thrust and a lifting force may be supplied by wings 104.

Figure 3A:
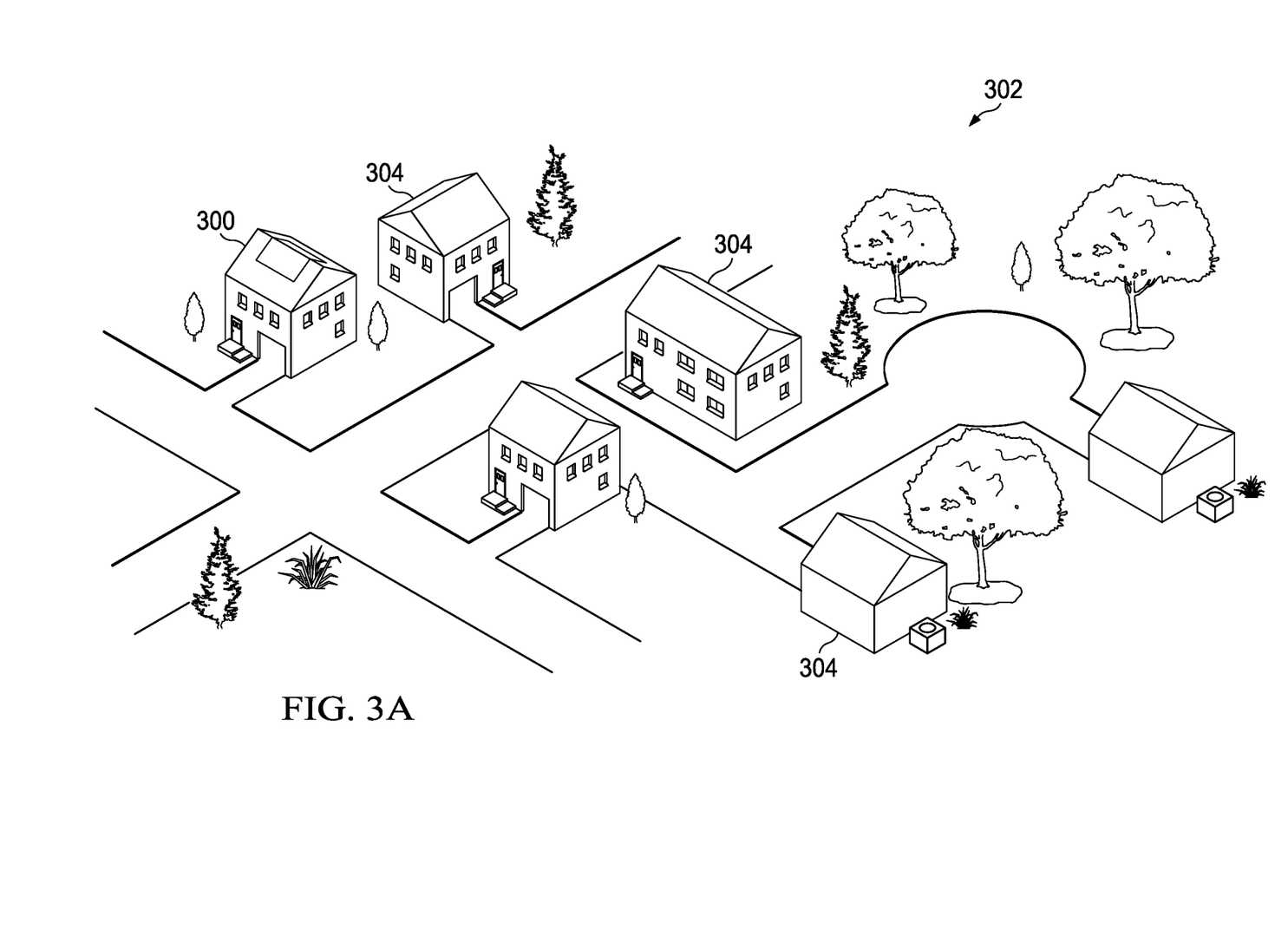
FIGS. 3A-3C illustrate various features of a UAS kiosk in accordance with certain example embodiments.
Figure 3B:
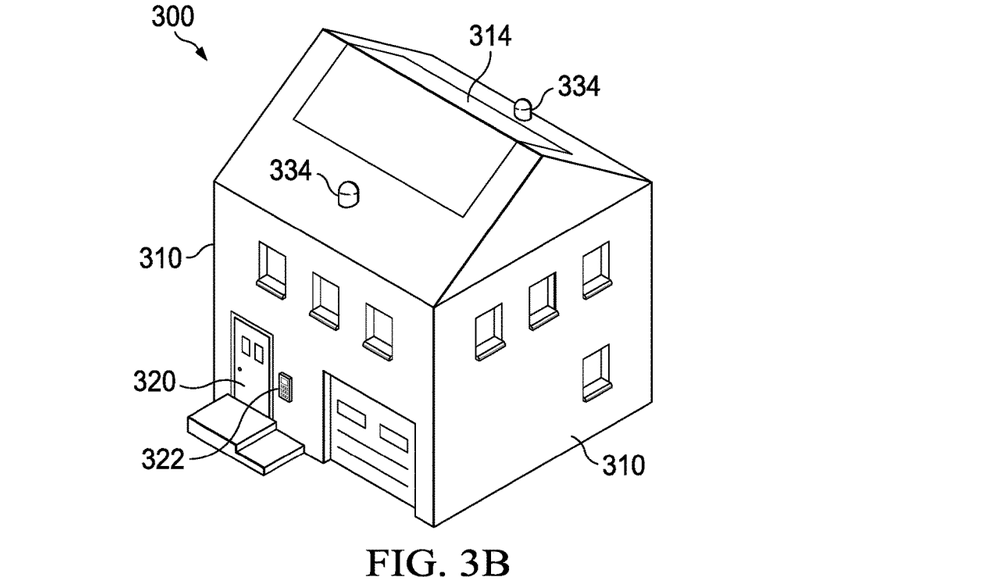
Figure 3C:
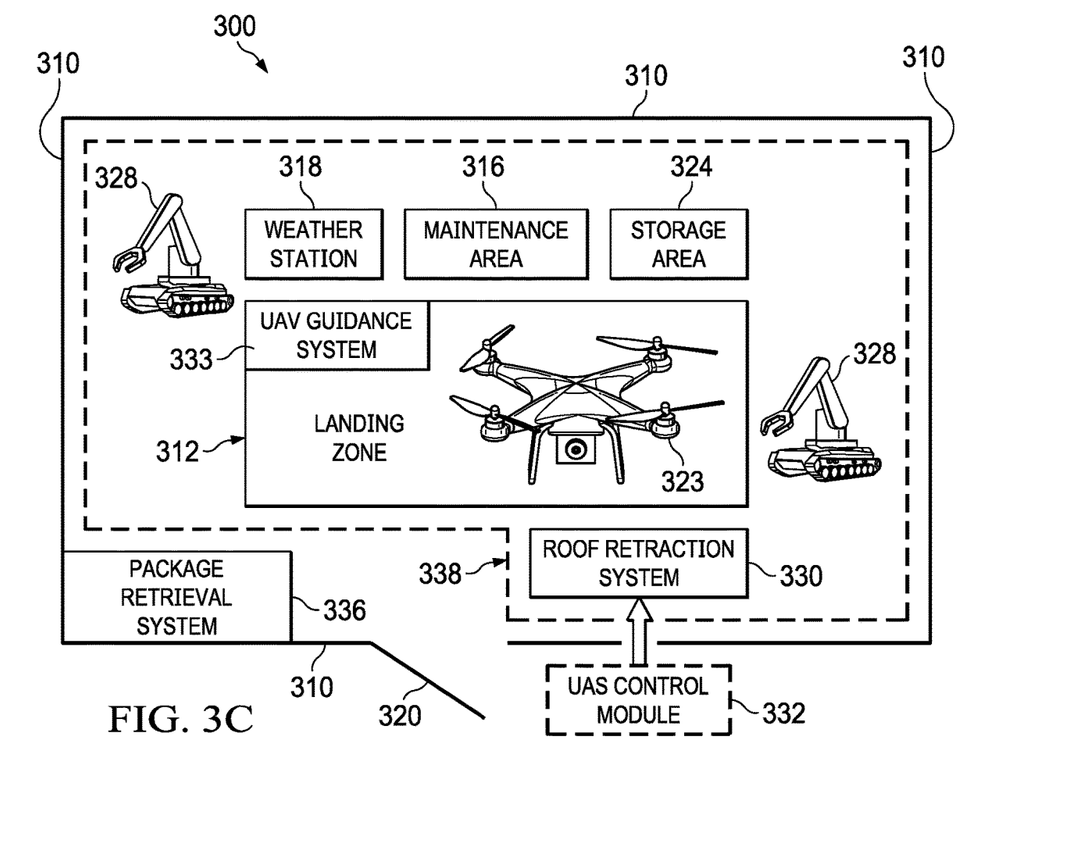

FIGS. 3A-3C illustrate various aspects of a UAS including an example UAS kiosk 300 in accordance with embodiments described herein. At its core, the UAS kiosk 300 includes infrastructure for providing features described hereinbelow. As best shown in FIG. 3A, in certain embodiments, the kiosk 300 may be designed to blend in with its environment 302, which may be a neighborhood or a community in which the kiosk is located. In the illustrated embodiment, the environment 302 comprises a neighborhood including a number of homes 304. In alternative embodiments, the environment 302 may be a commercial district including a number of commercial buildings. As best shown in FIG. 3C, which illustrates a schematic illustration of the kiosk 300 from above, in certain embodiments, the kiosk includes an enclosure comprising one or more vertical walls 310 surrounding and/or defining at least a landing zone (LZ) 312. A top of the kiosk 300 may be open or covered by a retractable roof 314 (FIG. 3B).

In various embodiments, the kiosk 300 provides one or more of protection from winds during UAS landing (i.e., due to walls 310), noise abatement, a secured LZ 312, maintenance space 316, and a weather station 318 including weather sensors. The kiosk 300 may further provide controlled access to the interior of the kiosk, including LZ 312, e.g., in the form of a door 320 having a keypad 322 (FIG. 3B). Access control may be managed by a service provider, and, in addition to the keypad 322, may take the form of video monitoring and autonomous LZ evaluation. The kiosk 300 may further provide protection from weather between flights for UAVs, such as UAV 323 (which may be similar or identical to the UAV 100 (FIG. 1)), in the form of a covered storage area 324, charging infrastructure 326 for charging UAVs, and one or more ground robots 328 for performing a variety of functions related to the UAVs, such as battery swapping, payload removal and sorting, and moving the UAVs to and from the storage area 324 for storage between use and/or overnight.

As previously noted, the roof 314 of the kiosk 300 may be retractable, in which case the roof may be selectively retracted under the control of a roof retraction module 330 in response to control signals communicated from a remote UAS ground control module 332 (which may include a fleet management system) associated with an approaching UAV or in response to signals directly from the approaching UAV itself. The roof 314 may also be selectively retractable under the control of roof retraction system 330 in response to signals provided by sensors 334 (including, for example, cameras) associated with the kiosk 300.

Embodiments described herein for implementing a UAS kiosk, such as the kiosk 300, may provide an alternative to providing last mile deliveries using UAVs, such as UAV 100 (FIG. 1). In particular, such a hub-to-kiosk delivery model provides certain advantages, including safety and social acceptance. This model also supports bi-directional delivery, in which users may use the UAS kiosks to drop off packages, as well as retrieve packages from the kiosk.

As previously noted, in certain embodiments, a UAS kiosk may include one or more secured entry points (e.g., door 314). Security may be provided through video monitoring of the entry point, as well as a coded access to areas in which packages are held (package retrieval area 336) such that only authorized users have access to various areas of the interior of the kiosk. The UAS kiosk may also provide one or more secured areas for UAVs, such as secured area 338, to prevent users from accessing and/or tampering with UAVs that may be grounded at the kiosk 300 for maintenance, charging, and/or down time. This secured area 338 for UAVs may include a maintenance area 316, a charging area 326, a storage (or "hangar") area 324, and/or the LZ 312. Certain authorized personnel may have access to the secured area 338 for UAVs, whereas other users may only have access to a package retrieval area 336, as will be described in detail below.

In some embodiments, the secured LZ 312 may be enclosed by a perimeter fence or wall and may include security for providing controlled access thereto and may include a monitoring system for detecting debris or other obstructions that may inhibit or impede safe landing of a UAV (e.g., UAV 323) in the LZ 312. Such information may be conveyed to ground control module/fleet management system 332 or directly to a UAV attempting to land in the LZ 312 in order to adjust the terminal phase of UAV flight. In certain embodiments, access to the LZ 312 may be locked automatically, even to authorized personnel, when a UAV is inbound and/or landing in the LZ. LZ may include a guidance system 333 including differential GPS, beacons, or other sensors/sensor arrays may be provided for enabling precision landing by UAVs. Such precision landing is further supported by the enclosure around the LZ 312 provided by the UAS kiosk 300, which provides protection against the UAV being buffeted by winds during hover. Additionally and/or alternatively, sensors 330 may include optical and/or LIDAR systems may be advantageously employed to implement various aspects of security, monitoring and/or landing assistance.

In some embodiments, the maintenance area 316 may be secured and monitored and may provide an area in which human technicians and/or robots (e.g., ground robots 328) may provide maintenance services for the UAVs between flights. Such maintenance services may include routine maintenance services, inspection, damage repair and/or battery replacement. The charging area 326 may be secured and monitored and may provide an area, as well as equipment and technology, for charging the UAVs between flights. The storage, or hangar, area 324 may be secured and monitored and may be used for safely and temporarily storing the UAVs between flights (e.g., overnight). The storage area 324 may also be used for storing replacement parts and/or other equipment necessary or useful for servicing the UAVs at the UAS kiosk 300.

In some embodiments, the weather station 318 may include sensors for monitoring local weather (e.g., by polling local weather radar and/or using sensors to determine current weather conditions at the UAS kiosk site), as well as communications devices for providing local weather information to the ground control module/fleet management system 332.

In certain embodiments, entry to the UAS kiosk 300 may include a tablet or other I/O device (e.g., keypad 322) for receiving proof of identity from a user (e.g., a recipient of a delivery to the UAS kiosk 300) and for providing information to a user (e.g., an ETA for a delivery scheduled to arrive at the UAS kiosk). In certain embodiments, the UAS kiosk 300 may provide external shelter (e.g., a porch with a roof) at the kiosk entry point (e.g., door 314) for sheltering users as they interact with the tablet or I/O device 322.

Figure 4:
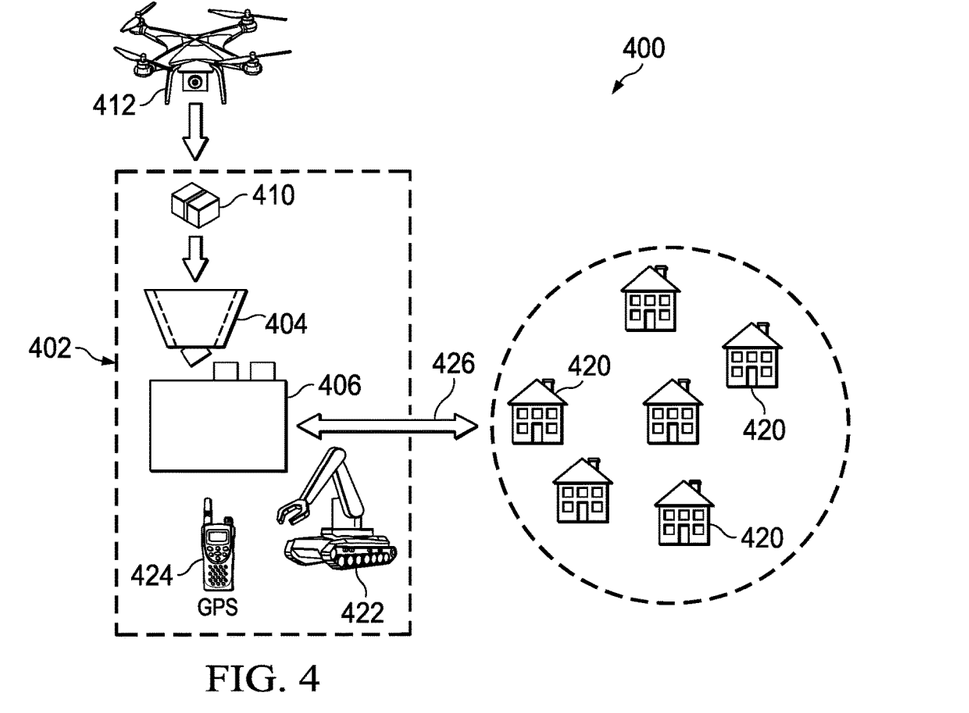
FIG. 4 is a schematic diagram illustrating features of a UAS kiosk in accordance with certain example embodiments.

FIG. 4 is a schematic illustration of an environment including an embodiment of a UAS kiosk 400, which may share features of the kiosk 300 shown in FIG. 3. As shown in FIG. 4, the kiosk 400 may be surrounded by a fence, or other enclosure, 402, and may include one or more of a package sorting funnel 404, an RFID enabled package sorting system 406, and locker system 408. In one embodiment, the locker system 408 includes an RFID-tagged cell phone notification-enabled system. In certain embodiments, when a package (e.g., a package 410) delivered by a UAV 412 is sorted into one of the lockers of the locker system 408, the resident to whom the package is addressed is notified (e.g., via his or her cell phone) to pick up the package from the locker of the locker system. In some embodiments, the package sorting system 406 causes the package to be placed in a locker of the locker system 408 assigned to the addressee. In other embodiments, the package sorting system 406 causes the package to be placed in a random one of the lockers of the locker system 408 and the locker system notifies the addressee which locker the package is in. It will be recognized that the lockers of the locker system 408 may be access controlled, in which case the locker system 408 may also provide the addressee with access information (e.g., a QR code to be read by a code reader provided in connection with the locker system or a code to be entered in a keypad associated with the locker system, for example). The notification message may also include access information for the kiosk 400 as well.

As illustrated in FIG. 4, an addressee may be a resident of one of a plurality of homes 420 geographically near the kiosk 400. In certain embodiments, residents may arrange for delivery of a package directly to their home 420 by a ground robot 422. The embodiment illustrated in FIG. 4 provides particular advantages over direct to addressee (or recipient) delivery services using UAVs. In particular, the illustrated embodiment reduces the amount of time that a UAV must spend in hover mode while making a delivery and reduces the weight that must be carried onboard by the UAV, as no winch and harness system is required, because the UAV 412 simply hovers over the package sorting funnel 404 and drops the package 410 into the funnel. As a result, the embodiments illustrated in FIG. 4 may increase flight time between charges for a UAV versus a direct to addressee system.

In certain embodiments, during operation, a UAV (e.g., UAV 412) carrying a package (e.g., package 410) enters the kiosk 400 from the top, hovers over the package sorting funnel 404, and drops the package into the funnel. In some embodiments, a beacon or navigational aid (such as a differential GPS system) 424 may be provided for supplying an electronic signal for terminal phase guidance for assisting the UAV to align with the funnel.

The funnel 404 directs the package 410 to an RFID package sorter 406, which in some embodiments reads an RFID tag on the package and causes it to be placed in one of a number of RFID-tagged lockers of the locker system 408. In certain embodiments, once the package is placed in a locker, a notification (e.g., text, email, phone 426 is provided to a recipient of the package (identified using the RFID code associated with the package and read by the RFID package sorting machine) that his or her package has been delivered to the kiosk 400. In certain embodiments, the notification 426 includes an access code or other access information to enable to the recipient to enter the kiosk 400, as well as an identification as to the locker in which the package is located, and an access code or other information to enable the recipient to locate the locker and to retrieve the package from the locker. The locker system 408 may include a control system for this purpose.

In certain embodiments, the locker system 408 may comprise multiple lockers stacked one on top of the other and with selectively closeable lids, which may slide shut over the locker once a package has been deposited therein. In this manner, the lockers in a single column may be filled sequentially from bottom to top. It will be recognized that multiple columns of lockers may be provided, with the funnel and package sorting machine moving from a first column to a second when the first column of lockers has been completely filled. In this manner, recipients are not assigned a particular locker but are notified of the locker location for a particular delivery. In alternative embodiments, recipients may be assigned a particular locker, in which case the RFID code on the package is used to identify the locker to which the package is to be delivered and other mechanisms (e.g., ground robots 422) may be used to place the package in the assigned locker. In still other embodiments, the ground robots 422 may be used to deliver the package directly to the recipient at a designated location (e.g., the recipient's residence or place of business). Other embodiments for populating the lockers with deliveries and notifying recipients may also be implemented without departing from the spirit or scope of embodiments described herein.

It will be recognized that in some embodiments, the infrastructure of the UAS kiosk is designed to support a variety of carriers and guidance systems as well as a variety of types of vehicles having remote release payload systems. Such vehicles may include, without limitation, autonomous pod transport (APT) vehicles, tailsitter aircraft, quadcopters, hexcopters, and octocopters, for example.

In particular embodiments, the UAS kiosk is easily replicable and customizable such that it can be designed to blend in with and/or aesthetically integrate into the particular area in which it is situated. In various embodiments, the UAS kiosk may comprise the roof top of an existing building, a shell of a building (e.g., a house) with the roof removed or with a retractable roof, for example. Additionally and/or alternatively, the UAS kiosk may include a natural barrier, such as a grove of trees for example.

Additional advantages of embodiments described herein include but are not limited to package security, prevention of elemental exposure of packages, minimization of potential liability for damage caused by UAVs, minimization of likelihood of damage to UAVs, minimization of UAV congestion, localization of noise paths and abatement of noise, and more precision landings.

Figure 5:
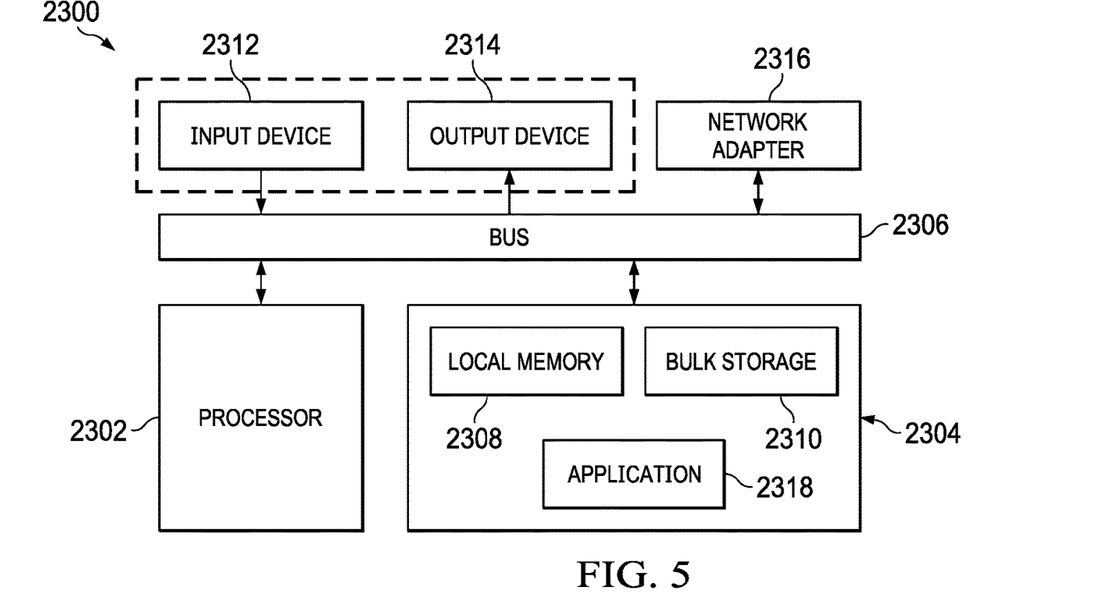
FIG. 5 provides a block diagram illustrating an example data processing system that may be configured to control operation of one or more systems of a UAS delivery kiosk in accordance with certain example embodiments.

FIG. 5 provides a block diagram illustrating an example data processing system 2300 that may be configured to control operation of one or more systems configured to provide a UAS delivery kiosk according to some embodiments of the present disclosure. For example, the data processing system 2300 may be configured to implement or control portions of various systems and modules, including but not limited to the guidance system 333, the roof retraction system 330, the package retrieval system 336, and the UAS control module 332 as described herein.

As shown in FIG. 5, the data processing system 2300 may include at least one processor 2302, e.g. a hardware processor 2302, coupled to memory elements 2304 through a system bus 2306. As such, the data processing system may store program code within memory elements 2304. Further, the processor 2302 may execute the program code accessed from the memory elements 2304 via a system bus 2306. In one aspect, the data processing system may be implemented as a computer that is suitable for storing and/or executing program code. It should be appreciated, however, that the data processing system 2300 may be implemented in the form of any system including a processor and a memory that is capable of performing the functions described within this disclosure.

In some embodiments, the processor 2302 can execute software or an algorithm to perform the activities as discussed in the present disclosure. The processor 2302 may include any combination of hardware, software, or firmware providing programmable logic, including by way of non-limiting example a microprocessor, a digital signal processor (DSP), a field-programmable gate array (FPGA), a programmable logic array (PLA), an application specific IC (ASIC), or a virtual machine processor. The processor 2302 may be communicatively coupled to the memory element 2304, for example in a direct-memory access (DMA) configuration, so that the processor 2302 may read from or write to the memory elements 2304.

In general, the memory elements 2304 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 2300 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures can also include suitable interfaces for receiving, transmitting, and/or otherwise communicating data or information in a network environment so that they can communicate with, e.g., the data processing system 2300.

In certain example implementations, portions of mechanisms described herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 2304 shown in FIG. 5, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 2302 shown in FIG. 5, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 2304 may include one or more physical memory devices such as, for example, local memory 2308 and one or more bulk storage devices 2310. The local memory may refer to RAM or other non-persistent memory device(s) generally used during actual execution of the program code. A bulk storage device may be implemented as a hard drive or other persistent data storage device. The processing system 2300 may also include one or more cache memories (not shown) that provide temporary storage of at least some program code in order to reduce the number of times program code must be retrieved from the bulk storage device 2310 during execution.

As shown in FIG. 5, the memory elements 2304 may store an application 2318. In various embodiments, the application 2318 may be stored in the local memory 2308, the one or more bulk storage devices 2310, or apart from the local memory and the bulk storage devices. It should be appreciated that the data processing system 2300 may further execute an operating system (not shown in FIG. 5) that can facilitate execution of the application 2318. The application 2318, being implemented in the form of executable program code, can be executed by the data processing system 2300, e.g., by the processor 2302. Responsive to executing the application, the data processing system 2300 may be configured to perform one or more operations or method steps described herein.

Input/output (I/O) devices depicted as an input device 2312 and an output device 2314, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 2314 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 2314. Input and/or output devices 2312, 2314 may be coupled to the data processing system either directly or through intervening I/O controllers.

In an embodiment, the input and the output devices may be implemented as a combined input/output device (illustrated in FIG. 5 with a dashed line surrounding the input device 2312 and the output device 2314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 2316 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 2300, and a data transmitter for transmitting data from the data processing system 2300 to said systems, devices and/or networks. Modems, cable modems, and Ethernet cards are examples of different types of network adapter that may be used with the data processing system 2300.

Example 1 provides a kiosk for use an unmanned aerial system (UAS) delivery system, the kiosk comprising an enclosure comprising at least one vertical wall having a secured entrance therethrough to prevent unauthorized persons from entering the enclosure, wherein an external appearance of the enclosure corresponds to a location of the kiosk; a landing zone for an unmanned aerial vehicle (UAV) of the UAS located within the enclosure, the landing zone comprising infrastructure from which the UAV can take off and on which the UAV can land; sensors for detecting an environment of at least one of the kiosk and the enclosure; and a guidance system for providing signals to the UAV to guide the UAV into the enclosure and onto the landing zone.

Example 2 provides the kiosk of example 1, further comprising a retractable roof disposed over a top of the enclosure.

Example 3 provides the kiosk of example 2, further comprising a retractable roof control module for selectively retracting the roof in response to control signals from at least one of a control center of the UAS and the UAV.

Example 4 provides the kiosk of any of examples 1-3, further comprising a secured area within the enclosure having a secured entrance to prevent unauthorized persons from entering the secured area, wherein the landing zone is within the secured area.

Example 5 provides the kiosk of any of examples 1-4, further comprising a charging station within the enclosure, the charging station including equipment for charging the UAV.

Example 6 provides the kiosk of any of examples 1-5, further comprising a maintenance area within the enclosure, the maintenance area comprising equipment for use by a maintenance personnel to conduct maintenance on the UAV.

Example 7 provides the kiosk of any of examples 1-6, further comprising a storage area within the enclosure, the storage area comprising equipment for securely storing the UAV.

Example 8 provides the kiosk of any of examples 1-7, further comprising a weather station, the weather station comprising equipment for determining information regarding current weather in the vicinity of the kiosk and for communicating the determined current weather information to a control station of the UAS.

Example 9 provides the kiosk of any of examples 1-8, further comprising a package pickup area, the package pickup area comprising equipment for securely storing packages addressed to recipients.

Example 10 provides the kiosk of example 9, wherein the package pickup area equipment comprises a locker, and wherein one of the packages addressed to one of the recipients is stored in the locker.

Example 11 provides the kiosk of example 10, wherein the package pickup area equipment communicates to the one of the recipients information for enabling the one of the recipients to enter the kiosk and open the locker to gain access to the one of the packages.

Example 12 provides the kiosk of any of examples 1-11, further comprising ground robots for transporting the UAV within the enclosure.

Example 13 provides a kiosk for use an unmanned aerial system (UAS) delivery system, the kiosk comprising an enclosure comprising at least one wall including a door therethrough; a package receipt system within the enclosure, the package receipt system comprising a package sorting funnel for receiving a package from a UAV hovering over the packages sorting funnel, wherein the package includes radio frequency identification (RFID) tag affixed thereto; a locker system comprising a plurality of secured lockers; a package sorting system that places the received package into one of the plurality of secured lockers based on the RFID tag; and a notification system for providing a notification to a recipient of the received package, wherein the recipient is identified based on the RFID tag.

Example 14 provides the kiosk of example 13, wherein the door comprises a secured entrance to the enclosure to prevent unauthorized persons from gaining access to the package receipt system.

Example 15 provides the kiosk of example 14, wherein the notification includes information for enabling the recipient to enter the enclosure through the secured entrance.

Example 16 provides the kiosk of any of examples 13-15, wherein the notification includes information for identifying the one of the plurality of secured lockers and information for enabling the recipient to open the one of the plurality of secured lockers to access the package.

Example 17 provides the kiosk of any of examples 13-16, wherein the notification comprises at least one of a phone call, an email, and a text message.

Example 18 provides a package receipt system for an unmanned aerial system (UAS) delivery system, the package receipt system comprising a package sorting funnel for receiving a package from a UAV hovering over the packages sorting funnel, wherein the package includes radio frequency identification (RFID) tag affixed thereto; a locker system comprising a plurality of secured lockers; a package sorting system that places the received package into one of the plurality of lockers based on the RFID tag; and a notification system for providing a notification to a recipient of the received package, wherein the recipient is identified based on the RFID tag.

Example 19 provides the package receipt system of example 18, wherein the notification includes information for identifying the one of the plurality of secured lockers and information for enabling the recipient to open the one of the plurality of secured lockers to access the package.

Example 20 provides the package receipt system of any of claims 18-19, wherein the notification comprises at least one of a phone call, an email, and a text message.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A kiosk for use in an unmanned aerial system (UAS) delivery system, the kiosk comprising:
   an enclosure comprising at least one vertical wall having an entrance therethrough, wherein the entrance is secured by an access control system to prevent unauthorized persons from entering the enclosure;
   a landing zone for an unmanned aerial vehicle (UAV) of the UAS located within the enclosure, the landing zone comprising infrastructure from which the UAV can take off and on which the UAV can land;
   sensors for detecting an environment of at least one of the kiosk and the enclosure;
   a guidance system for providing signals to the UAV to guide the UAV into the enclosure and onto the landing zone;
   a retractable roof disposed over a top of the enclosure; and
   a retractable roof control module for selectively controlling a position of the retractable roof in response to control signals from the UAV.

2. The kiosk of claim 1, further comprising a secured area within the enclosure having a secured entrance to prevent unauthorized persons from entering the secured area, wherein the landing zone is within the secured area.

3. The kiosk of claim 1, further comprising a charging station within the enclosure, the charging station including equipment for charging the UAV.

4. The kiosk of claim 1, further comprising a maintenance area within the enclosure, the maintenance area comprising equipment for use by a maintenance personnel to conduct maintenance on the UAV.

5. The kiosk of claim 1, further comprising a storage area within the enclosure, the storage area comprising equipment for securely storing the UAV.

6. The kiosk of claim 1, further comprising a weather station, the weather station comprising equipment for determining information regarding current weather in the vicinity of the kiosk and for communicating the determined current weather information to a control station of the UAS.

7. The kiosk of claim 1, further comprising a package pickup area, the package pickup area comprising equipment for securely storing packages addressed to recipients.

8. The kiosk of claim 7, wherein the package pickup area equipment automatically and without human intervention comprises a locker, and wherein one of the packages addressed to one of the recipients is stored in the locker.

9. The kiosk of claim 8, wherein the package pickup area equipment communicates to the one of the recipients' information for enabling the one of the recipients to enter the kiosk and open the locker to gain access to the one of the packages.

10. The kiosk of claim 1, further comprising ground robots for transporting the UAV within the enclosure.

11. A kiosk for use an unmanned aerial system (UAS) delivery system, the kiosk comprising:
an enclosure comprising at least one wall including a door therethrough;
a package receipt system within the enclosure, the package receipt system comprising:
a package sorting funnel for receiving a package dropped into the package sorting funnel from a UAV hovering above the kiosk and the package sorting funnel, wherein the package includes radio frequency identification (RFID) tag affixed thereto;
a locker system comprising a plurality of secured lockers;
a package sorting system configured to receive the package from the package sorting funnel and to automatically and without human intervention identify one of the plurality of secured lockers based on the RFID tag and place the received package into the identified one of the plurality of secured lockers; and
a notification system for providing a notification to a recipient of the received package, wherein the recipient is identified based on the RFID tag.

12. The kiosk of claim 11, wherein the door comprises a keypad and wherein access to the enclosure through the door is gained by entering an access code using the keypad.

13. The kiosk of claim 12, wherein the notification includes the access code.

14. The kiosk of claim 11, wherein the notification includes information identifying the one of the plurality of secured lockers and an access code for enabling the recipient to open the one of the plurality of secured lockers to access the package.

15. The kiosk of claim 11, wherein the notification comprises at least one of a phone call, an email, and a text message.

16. A package receipt system for an unmanned aerial system (UAS) delivery system, the package receipt system comprising:
a package receipt system within an enclosure, the package receipt system comprising:
a package sorting funnel for receiving a package dropped into the package sorting funnel from a UAV hovering above the kiosk and the package sorting funnel, wherein the package includes radio frequency identification (RFID) tag affixed thereto;
a locker system comprising a plurality of secured lockers;
a package sorting system configured to receive the package from the package sorting funnel and to automatically and without human intervention identify one of the plurality of secured lockers based on the RFID tag and place the received package into the identified one of the plurality of secured lockers; and
a notification system for automatically and without human intervention providing a notification to a recipient of the received package, wherein the recipient is identified based on the RFID tag.

17. The package receipt system of claim 16, wherein the notification includes information for identifying the one of the plurality of secured lockers and information for enabling the recipient to open the one of the plurality of secured lockers to access the package.

18. The package receipt system of claim 16, wherein the notification comprises at least one of a phone call, an email, and a text message.

* * * * *

UNITED STATES PATENT AND TRADEMARK OFFICE
CERTIFICATE OF CORRECTION

PATENT NO. : 12,304,657 B2  
APPLICATION NO. : 17/538536  
DATED : May 20, 2025  
INVENTOR(S) : Jason Paul Hurst et al.

Page 1 of 1

It is certified that error appears in the above-identified patent and that said Letters Patent is hereby corrected as shown below:

In the Claims

In Column 15, Claim 11, Line 12, insert -- in -- after "use".

Signed and Sealed this  
Eighth Day of July, 2025

Coke Morgan Stewart  
*Acting Director of the United States Patent and Trademark Office*